United States Patent [19]

Hovens et al.

[11] 4,308,555
[45] Dec. 29, 1981

[54] TELEVISION PICTURE DISPLAY DEVICE

[75] Inventors: Paulus J. M. Hovens; Wouter Smeulers, both of Eindhoven, Netherlands

[73] Assignee: U.S. Philips Corporation, New York, N.Y.

[21] Appl. No.: 142,206

[22] Filed: Apr. 21, 1980

[30] Foreign Application Priority Data

May 9, 1979 [NL] Netherlands .......................... 7903625

[51] Int. Cl.³ ............................................. H04N 5/68
[52] U.S. Cl. .................................................... 358/243
[58] Field of Search ................................. 358/243, 74

[56] References Cited

U.S. PATENT DOCUMENTS 3,674,932  7/1972  Griepentrog .......................... 358/243
4,017,681  4/1977  Smeulers et al. ..................... 358/243
4,126,884  11/1978  Shanley ................................ 358/243
4,218,720  8/1980  Kam ..................................... 358/243

Primary Examiner—Richard Murray
Attorney, Agent, or Firm—Thomas A. Briody; William J. Streeter; Laurence A. Wright

[57] ABSTRACT

In a class-B output amplifier having an npn-transistor the collector of which controls a cathode of a picture display tube via oppositely conducting parts of a diode and an emitter follower, respectively, a signal corresponding with the beam current through the relevant cathode is obtained from the collector circuit of an npn-transistor whose base-emitter path is arranged in parallel with the diode. The signal corresponding with the beam current can be used for controlling a background current and for limiting a beam current, respectively.

5 Claims, 1 Drawing Figure

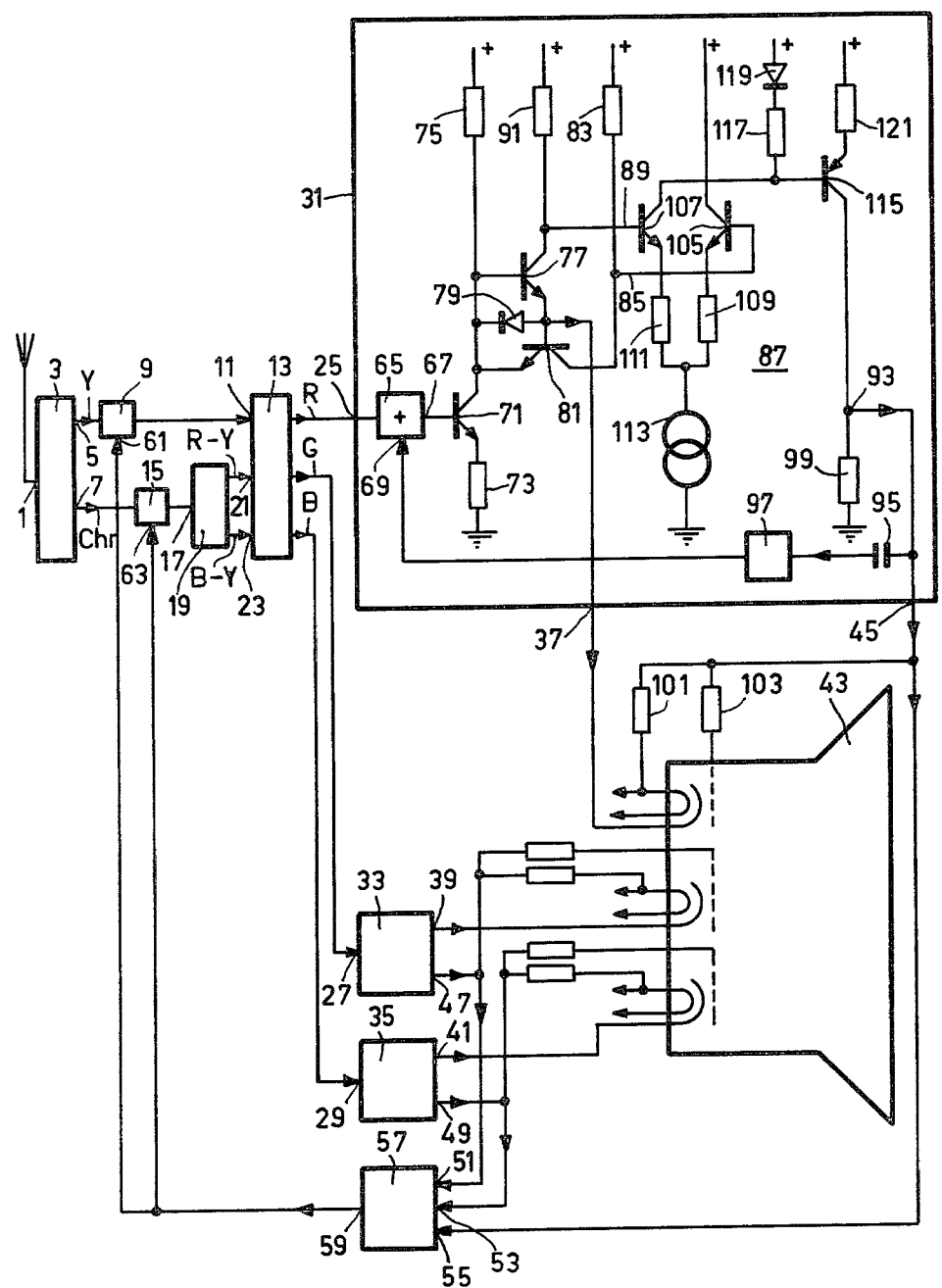

TELEVISION PICTURE DISPLAY DEVICE

BACKGROUND OF THE INVENTION

The invention relates to a television picture display device having a picture display tube a cathode circuit of which is connected to an output of a video-output amplifier, this output being connected to a collector circuit of a transistor via an emitter follower and a diode, the emitter of the emitter follower and the anode of the diode being connected to the output of the video output amplifier.

Such a television picture display device is known from Valvo Entwicklungsmitteilungen 75a, page 19. The video output stage utilised therein uses only transistors of the npn-type, so that the video output stage is easier to implement as an integrated circuit than an output stage having complementary transistors.

The invention has for its object to provide a possibility to obtain from the output stage of this television picture display device a datum about the cathode current of the picture display tube without rendering it more difficult to integrate the output stage, while the number of additional components is kept as low as possible.

SUMMARY OF THE INVENTION

A television picture display device of the type mentioned in the opening paragraph is characterized in that arranged in parallel with the diode there is the base-emitter juncture of a npn-transistor the collector circuit of which is connected to an input of a circuit for measuring the beam current of the relevant cathode of the picture display tube, and the base of which is connected to the anode of the diode.

The provision in the indicated position of a transistor of the npn-type only is a simple and cheap possibility to measure the beam current datum which enables a background current control of the picture display tube and a limitation of the average value of the beam current. Limitation of high-frequency-containing peak values of the beam current can be achieved when the television picture display device is further characterized in that the collector circuit of the emitter follower is connected to a further input of the circuit for measuring the beam current.

BRIEF DESCRIPTION OF THE DRAWINGS

The invention will now be explained with reference to the drawing, the sole FIGURE of which shows a circuit diagram of a television picture display device according to the invention.

A television signal is applied to an input 1 of a high-frequency, intermediate frequency and demodulation section 3 of a television receiver. The section 3 then produces a luminous signal Y to a first output 5 and a chrominance sgnal CHR to a second output 7. The luminance signal Y is applied to an input 11 of a matrix circuit 13 via an amplifier 9. Via an amplifier 15 the chrominance signal CHR is applied to an input 17 of a demodulation circuit 19, which applies colour difference signals R-Y and B-Y to two further inputs 21, 23 of the matrix circuit 13. The matrix circuit 13 then supplies colour signals R, G and B, which are applied to an input 25, 27 and 29, respectively, of an amplifying and measuring circuit 31, 33 and 35, respectively.

The amplifying and measuring circuits 31, 33, 35 are identical and each circuit has a video signal output 37 and 39, 41, respectively, which is connected to a cathode of a picture display tube 43 and to a measuring signal output 45 and 47, 49, respectively, which are connected to an input 51 and 53, 55, respectively of a circuit 57 for producing a beam current limiting signal, an output 59 of which applies a control signal to an input 61 and 63, respectively, of the amplifier 9 and 15, respectively, by means of which the gain of these amplifiers 9, 15 and, consequently, the beam current is controllable.

The amplifying and measuring circuit 31 has a preamplifier 65 a video signal input of which constitutes the input 25 of the amplifying and measuring circuit 31. A video signal whose d.c. voltage level, which has for its purpose to keep a background luminance constant, is influenced by a control signal applied to an input 69 of the preamplifier 65, is obtained from an output 67 of this preamplifier. This video signal is applied to the base of an npn-transistor 71 which forms part of a video output stage. The emitter of this transistor 71 is connected to ground via a resistor 73 and its collector is connected to a positive voltage via a resistor 75. The video output stage further comprises an emitter follower having an npn-transistor 77 the base of which is connected to the collector of the transistor 71 and the emitter to the output 37, and a diode 79 which, in an implementation as integrated circuit may also be formed by an npn-transistor the anode of which is connected to the output 37 and the cathode to the collector of the transistor 71.

The base-emitter junction of an npn-transistor 81 is arranged in parallel with the diode 79, the base of this transistor is connected to the anode, the emitter to the cathode of the diode 79. The low-frequency components of the cathode current of the relevant cathode of the picture display tube 43 and the negative-going edges of the high-frequency components flow through the diode 79 and the base-emitter junction of the transistor 81. The positive going edges of the high frequency components are transferred by the emitter follower 77.

For the lower video frequencies the collector current of transistor 81 is proportional to the beam current through the relevant picture display tube cathode and a voltage corresponding therewith is obtained across a collector resistor 83 which voltage is applied to an input 85 of a differential amplifier 87. A further input 89 of the differential amplifier 87 is connected to the collector of the emitter follower 77, which is further connected to a positive voltage via a resistor 91. The higher frequencies of a signal corresponding with the cathode current are now also transferred by the differential amplifier 87 in response to the signal at the input 89, and a signal which corresponds to the beam current of the relevant cathode appears at an output 93.

The differential amplifier 87 constitutes the input of a measuring circuit which produces a level control signal from the output signal of the differential amplifier via a capacitor 95 and a detection circuit 97 and applies this level control signal to the input 69 of the preamplifier 65 for clamping a reference value, for example the black level, on a fixed value in the beam current and which applies a signal for generating a beam current limiting signal to the input 55 of the circuit 57 via the output 45. The circuits 97 and 57 may have been partly combined or constructed separately, as, for example, described in the Netherlands patent application 74 11912 (PHN 7677). The circuit 97 may, for example, have a section which is jointly used by three cathode circuits and has a sequential measuring circuit, as also described in the above-mentioned application. Any suitable circuit can be used for the measurement of a signal corresponding to the beam current and for converting the measured values into the desired control signals. Such circuits are known per se and need no further description.

If the input 89 of the amplifier 87 is not connected to a constant level but to the collector of the transistor 77 instead, the low-frequency components of the cathode current can then only be converted into control signals. This may, for example, be the case for controlling the background current and for limiting the average beam current, respectively.

The circuit requires only one additional transistor 81, which is of the npn-type, just as the other transistor of the output stage, so that they can be easily incorporated together in an integrated circuit.

In this embodiment the differential amplifier 87 is of such a construction that an output signal is obtained across a resistor 99 which has a value of, for example, 1 kOhm, so that the output 93 is substantially at zero potential. The phase of the desired output signal is equal to the phase of the signal at the cathode of the picture display tube 43. Leakage currents to the cathode of the picture display tube occur at the heater and the control grid thereof in anti-phase with the cathode leakage current. Two resistors 101 and 103 having, for example, a value of 1MOhm, and being arranged between the heater and the control grid and the output 93 cause therefore a compensation of an unwanted output signal of the differential amplifier 87, produced by the leakage currents to the cathode.

The input 85 and 89, respectively, of the differential amplifier 87 is connected to the base of an npn-transistor 105 and 107, respectively, the emitter of which is connected to a current source 113 via a resistor 109 and 111, respectively, of, for example, 500 Ohm. The collector of the transistor 107 is connected to the base of a pnp-transistor 115 and to the positive voltage via a series arrangement of resistors 117 and 119. The transistor 115 has an emitter resistor 121 of, for example, a value of 1 kOhm, the resistors 117, 83 and 91 also having this value.

It will be apparent that also picture display devices comprising picture display tubes having a different number of cathodes can be constructed in accordance with the invention.

Although the drawing shows a connection between the emitter of the emitter follower 77 and the base of transistor 81, the anode of the diode 79 and the cathode of the picture display tube, it is possible, if so desired, to include, for example, series resistances or inductances in one or more of these connections.

The diode 79 forms with the transistor 81 a current-mirror circuit. Optionally, further switching elements may be disposed in the connections between this diode and the base and the emitter of the transistor 81, provided this does not affect the current-mirror operation of this circuit.

There is no need for the beam current limiting to be in the form of a contrast control; it may also be a luminance control or a combination of these two controls.

In the drawing the video amplifier 71, 73, 75, 79 is shown in a simple form but, if so desired, it may be constructed in a more complicated manner, for example having one or more diodes between the collector of the transistor 71 and the base of the emitter follower 77, or with a further transistor in the emitter circuit of the transistor 71.

What is claimed is:

1. A television picture display device having a picture display tube, a cathode circuit of which is connected to an output of a video output amplifier, this output being coupled to a collector circuit of a transistor via an emitter follower and a diode, the emitter of the emitter follower and the anode of the diode being connected to the output of the video output amplifier, characterized in that arranged in parallel with the diode there is the base-emitter junction of an npn-transistor the collector circuit of which is connected to an input of a circuit for measuring the beam current of the relevant cathode of the picture display tube and the base of which is connected to the anode of the diode.

2. A television picture display device as claimed in claim 1, characterized in that the collector circuit of the emitter follower is connected to a further input of the circuit for measuring the beam current.

3. A television receiver as claimed in claim 2, characterized in that the circuit for measuring the beam current forms part of a beam current limiting circuit.

4. A television receiver as claimed in claim 2 or claim 3 characterized in that the collector of the npn-transistor is connected to the input of a differential amplifier to an output whereof a heater and control grid terminal of the picture display tube are connected, each via a resistor.

5. A television picture display device as claimed in claim 1, characterized in that the circuit for measuring the beam current forms part of a background current control circuit.

* * * * *